INVENTOR
Gisbert Burkhardt

July 21, 1964  G. BURKHARDT  3,141,540
SHIFT REGISTER CONTROL FOR ARTICLE HANDLING DEVICE
Filed Aug. 14, 1961  4 Sheets-Sheet 3

INVENTOR
Gisbert Burkhardt

BY  *George H. Spencer*
ATTORNEY

Fig. 9

United States Patent Office 3,141,540
Patented July 21, 1964

3,141,540
SHIFT REGISTER CONTROL FOR ARTICLE
HANDLING DEVICE
Gisbert Burkhardt, Konstanz (Bodensee), Germany, assignor to Telefunken Patentverwertungs-G.m.b.H., Ulm (Danube), Germany
Filed Aug. 14, 1961, Ser. No. 131,401
Claims priority, application Germany Aug. 18, 1960
21 Claims. (Cl. 198—38)

The present invention relates generally to an article sorting machine, and more particularly to such a machine having a number of diverting switches along a conveying path and which: lead to individual receiving stations; are automatically controlled by means of a control register according to the destination of the individual articles; and are controlled in synchronism with article movement along the conveying path.

Automatic switch controls of this type are known in pneumatic tube plant technology and have lately been used, with relatively slight modification in record sorting machines and especially in telegram or letter sorting machines. These machines have a control register, subdivided into sections and subject to a stepwise signal transmission operation proceeding from section to section. This register controls the actuation of the switches. When an article or shipment enters the conveying path, a command signal is fed to the first section of the control register, which signal designates the switch which is to divert the entering shipment subsequently. A number of signal transmitters or article sensing devices are disposed along the conveying path and respond to the passage of the articles. Each article sensing device is connected with one section of the control register and initiates the stepwise transmission of the command signals up to the actuating member of the designated switch in synchronism with the movement of the individual articles. Feeler contacts or light beams associated with photoelectric devices, for example, may be provided as the article sensing devices.

In older pneumatic tube plants the control register included stepping switches of the known rotary selector type. Subsequently, control registers were constructed of groups of chains of register elements, such as special triggers or flip-flop circuits, each of which can assume only two electrical states. With respect to the circuit design of the control register, two basic forms have been developed.

In the first form, the individual register sections include an equal number of register elements or switching circuits having electrical states which are changed by signals transmitted stepwise from section to section, and together form a code. The actuating member of each switch is connected with the register elements of an associated section so that the switch is actuated when the proper code is registered in this section.

In the second basic form, a number of register chains are provided in the control register which correspond to the number of switches to be controlled and include individual register elements sequentially coordinated with the register sections. The output end of the last element of each register chain acts upon the actuating member of the associated switch.

In known automatic switch controls for sorting machines, double occupancy or two articles being disposed in a control section at the same time must be prevented by special measures which require that there be a relatively large minimum distance between consecutive articles. If this minimum distance is not maintained, for example, due to varying conditions affecting the behavior of the articles in the conveying path, the coordination of the command signals in the control register with the articles may be disturbed so that one or both shipments are improperly diverted. Generally, fixed coordination between or synchronization of the command signals present in the control register and the articles in the conveying path is not actually obtained. This is particularly disturbing if an article becomes lost on the conveying path, either because its spacing from the preceding shipment approaches or becomes zero due to the latter lagging behind, or because of an especially light or deformed shipment which moves out of the conveying path. This may shift the coordination with the command signals so that a number of succeeding articles will be misrouted.

With these defects of the prior art in mind, it is a main object of this invention to provide an automatic sorting device wherein the distances between consecutive articles may be substantially reduced without the device being subject to the above-mentioned difficulties.

Another object is to provide a sorting device wherein a positive coordination exists between command signals in the control register and articles in the conveying path.

A further object is to provide a device of the character described wherein when the spacing between articles is zero or an article is removed from the conveying path, the command signal for this article will never be erroneously coordinated with another article but will be automatically cancelled.

These objects and others ancillary thereto are accomplished according to preferred embodiments of the invention wherein the distance between the consecutive article sensing devices is less than the length of the shortest article to be handled. This permits a substantial increase in conveying density without there being any possibility of double occupancy.

The article sensing devices and the control register cooperate in such a manner that, when an article sensing device indicates an article is in a particular portion of the conveying path, the register section connected with this article sensing device receives the switching or command signal from the preceding register section, and in each register section an electrical state corresponding to a command signal can at most be maintained as long as the article is present in the effective range of the article sensing device connected with this section.

The invention does not require any special basic design of the control register. The invention may be used in an especially advantageous manner in sorting machines for letters and similar flat material to be conveyed, but is not restricted to this field. For example, the invention may also be used in automatic switchyards.

Additional objects and advantages of the present invention will become apparent upon consideration of the following description when taken in conjunction with the accompanying drawings in which.

Figure 1:
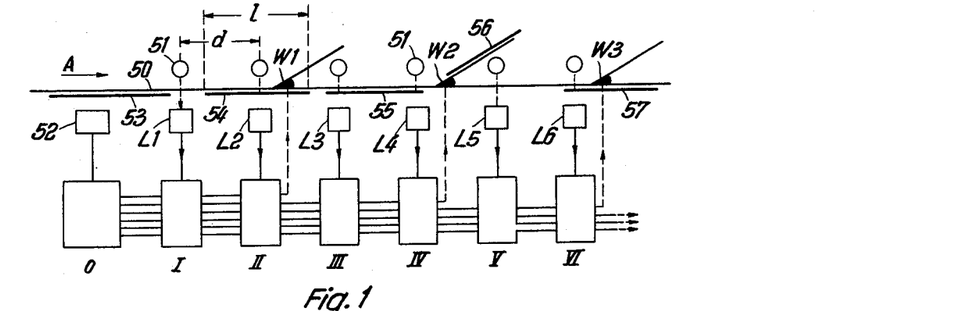
FIGURE 1 is a block diagram illustrating the fundamental design of a sorting machine according to the invention.

With more particular reference to the drawings, FIGURE 1 illustrates a sorting machine, for example, for sorting letters according to their intended destination. A conveying path 50 is provided by a conveyor which transports letters along this path. A number of diverting switches W1, W2, W3, etc., lead to receiving stations (not shown) and are arranged along the conveying path 50. The movement of the letters is in the direction of the arrow A. In order to save space, the drawing shows only the initial portion of this conveying path with the switches, W1, W2 and W3. The conveying path is subdivided into monitored sections by article or letter sensing means or devices. The letter sensing devices are known per se and each includes a light source 51 which projects a light beam transversely of the conveying path and a light sensitive receiving device L1–L6. Instead of photosensitive devices, different types of sensing devices may be used. Distances $d$ indicate the spacing of the sensing devices and it is not necessary that these distances be equal as shown in the figures of the drawings. There may be one or more sensing devices between two switches. To simplify the following description, the light sources 51 will no longer be mentioned when referring to the sensing devices L.

A control register is provided and includes sections 0–VI. The outputs of the sensing devices L1–L6 are connected with the sections I–VI of the control register. When a shipment enters the sorting machine, a command or switching signal is fed to the first section I of the control register by means of a signal transmitter or command unit 0. This command signal designates the switch which is to divert the shipment from the conveying path 50. Such signal might be initiated in the command unit 0 manually by an operator who first reads the address on the letter. However, it will be assumed that the shipments are provided with coded guide characters which are sensed by a scanning device 52 and are then fed to the command unit 0 and converted by the latter into command signals the nature of which depends upon the design of the control register. The signals of the sensing devices forward the command signals from section to section of the register in stepwise manner to the actuating member of the selected switch in synchronism with the movement of the shipment. The construction thus far disclosed is known.

According to the present invention, the mutual distance $d$ between the sensing devices is always smaller than the length $l$ of the shortest shipment to be sorted. Thus, when a shipment moves from one monitored section of the conveying path to the next, it is simultaneously sensed by two article sensing devices and double occupancy of a monitored section is not possible.

Also, the sensing devices and the control register are designed to cooperate with one another so that when a shipment enters the effective range of a sensing device, the register section connected with this sensing device is fed the switching signal from the preceding section. In each register section an electrical state corresponding to a command signal can be maintained at most as long as the shipment is present in the effective range of the sensing device connected with this section. These characteristics, which may be used in the various embodiments which will be described subsequently, result in the following mode of operation.

Assume that a shipment enters the sorting machine and is to be diverted by the switch W2. After its guide characters have been sensed by the scanning device 52, they are converted to command signals in register section 0 and fed to the input of the register section I. This signal is received by but does not yet register in this section when the shipment is in position 53. When the shipment enters the effective range of the sensing device L1, the register section I assumes the electrical state corresponding to the command signal and maintains this state until such time as the shipment leaves the effective range of this sensing device. However, before this occurs the next sensing device L2 senses the shipment. When this occurs register section II, connected with this sensing device, receives the signal from and assumes the electrical state of section I. During the time between the entry of the shipment into the effective range of sensing device L2 and its egress from the range of sensing device L1, the command signal is thus present in both register sections I and II. When the shipment is no longer sensed by L1, such as when the shipment assumes position 54, the command signal disappears in section I and is thus only present in the register section II.

When the shipment enters the ranges of the sensing devices L3 and L4, the command signal is transmitted in the same manner, to the register sections III and IV. As soon as the command signal registers in section IV, which occurs when the sensing device L4 disposed forwardly of the switch W2 is actuated and corresponding to shipment position 55, the command signal activates the actuating member (not shown in FIGURE 1) of the switch W2. The switch is thereby moved and guides the shipment into the branch path. The switch actuating members may advantageously be designed so that in each case the selected switch is held in its diverting position as long as the command signal is present in the associated register section. The switch W2 then remains in diverting position until the shipment leaves the effective range of the sensing device L4.

In a similar manner, the diverting of the switches W1, W3 or of the following switches (not shown) is effected as soon as a command signal designating these switches is received, and the corresponding sensing devices L are actuated by the register sections II or VI, respectively, or the corresponding later register sections.

The sorting machine according to the invention, as shown in FIGURE 1, permits the shipments to pass through the conveying path with relatively small distances therebetween without jeopardizing the proper stepwise registering operation and the coordination of the command signals with shipment movement. Due to the novel nature of the stepwise registering operation and of the cancellation of the command signals, a conveying density corresponding to the shipment positions 53–57 may be readily obtained. Furthermore, if a shipment should run up onto a preceding one or become lost, the command signal is automatically cancelled in the register and therefore cannot cause any disturbances.

The following embodiments illustrate how to achieve these characteristics of the control register and its cooperation with the sensing devices.

Figure 2:
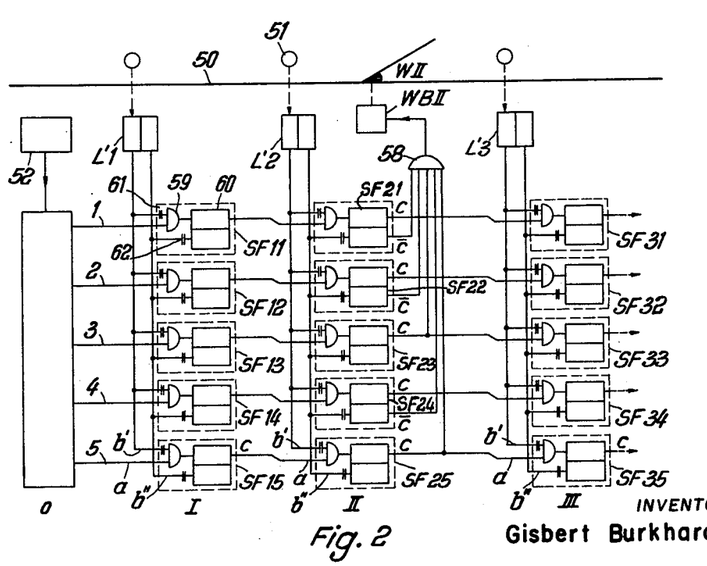
FIGURE 2 is a circuit diagram of a sorting machine with a control register illustrating, in block form, the circuits of which the individual sections are constructed.

In the sorting machine according to FIGURE 2, the individual sections I, II, III, etc., of the control register each comprises an equal number of switching circuits SF11–SF15, SF21–SF25, SF31–SF35, etc., whose outputs $c$ assume one of two states. In this manner they form in combination a code in functional dependence upon the signals appearing at the inputs of the switching circuit involved and the sequence of their arrival. These outputs are connected with one input of the corresponding switching circuit of the subsequent register section, while at least one other input of each circuit is connected with the article sensing device associated with this register section. The actuating member UBII of the switch WII is connected with the output of a decoding stage 58, whose inputs are linked with the outputs of the circuits of the register section II, in dependence upon the code coordinated with this switch.

In more detail, in the control register of FIGURE 2, each of the switching circuits SF has three inputs and includes an AND-gate 59 and a flip-flop 60. The first input $a$ and the second input $b'$ are connected to an AND-gate 59 whose output is fed to the flip-flop input, and the third input $b''$, connected to the flip-flop, makes resetting of this flip-flop circuit possible (see SF11 and SF25 in FIGURE 2). Each circuit SF is connected with the sensing device $L'$ of an associated register section so that, when a shipment enters the effective range of this sensing device, a signal of short duration arrives at the second input $b'$, and when the shipment leaves, a reset signal arrives at the third input $b''$ of the circuit element. In FIGURE 2, the short duration of the action of the sensing device signal upon the input $b'$ is indicated by a capacitor 61 in series with this input $b'$. All parallel inputs are connected to the common control line free of any reactive effect, which in the inputs $b''$ is indicated by a capacitor 62 (see SF11). The first input $a$ of each of the circuits SF11–SF15 of the first register section I is connected with the corresponding output line 1–5 of the command unit 0. The input $a$ of the circuits of the following register sections II, III, etc., is in each case connected with the output $c$ of the flip-flop circuit 60 of the corresponding circuit of the preceding register section I, II, etc.

The decoding stages 58 are expediently designed as AND-gates. If, for example, a two-out-of-five code is coordinated with the switch WII as the command signal, a signal appears at the outputs 3 and 5 of the command unit 0. The inputs of the AND-gate are connected with the outputs $c$ of the circuits SF23 and SF25 to which the signal is eventually transmitted. If all possible combinations of such a code are not to be utilized, a further increase of the operational stability may be obtained by simultaneously checking those circuits which do not correspond to the selected code to determine and/or assure that no signal appears at their outputs $c$. In the assumed case these are circuits SF21, SF22 and SF24. In a manner known per se, this may be achieved by providing at least circuits SF21, SF22 and SF24 with a second output $\bar{c}$, complementary to the first. Also, the input side of the AND-gate 58 is connected both with the outputs $c$ of the circuits SF23 and SF25 corresponding to the selected code, and also with the complementary outputs $\bar{c}$ of the remaining circuits.

Assume that the circuits of the first register section I are in rest position or condition and that a shipment destined for the switch WII enters the sorting machine. The corresponding command signal appears at the outputs 3 and 5 of the command unit 0 and thus at the inputs $a$ of the circuits SF13 and SF15. A signal appears at the outputs of the AND-gates 59 of this register section only when the shipment enters the range of the sensing device $L'1$, thereby causing a signal to appear at the second inputs $b'$ of the circuits SF13 and SF15. The flip-flop circuits 60 of these circuits register the signal by switching into their other stable electrical state, and the electrical state of their output $c$ changes. As soon as this occurs the command unit 0 may feed the command signal for the next shipment to the corresponding inputs $a$ of the register section I, for example, by exciting the lines 2 and 3. The electrical state of the circuits of this section cannot yet be changed, since at the second input $b'$ of the AND-gate 59 the required second signal will only appear when the front edge of this next shipment enters the range of the sensing device $L'1$, which is not yet possible. When the front of the first-mentioned shipment enters the range of the sensing device $L'2$, all inputs $b'$ of the AND-gates 59 of the second register section II receive a signal whereby the AND-gates of the circuits SF23 and SF25 cause the flip-flop circuits 60 of the switching circuits to change their electrical state, it being noted that the first inputs $a$ of circuits SF23 and SF25 have already received the output signal of the circuits SF13 and SF15.

Thus, the conditions for the decoding stage 58 to respond have been met, so that the switch WII is actuated by means of WBII. The reception of the command signal in section II has no influence whatsoever on the electrical state of the switching circuits of section I. The circuits SF13 and SF15 are brought back into their rest condition only when the rear edge of the first shipment leaves the effective range of sensing device $L'1$, thereby causing the reset signal to appear at the inputs $b''$ of the switching circuits of section I.

Immediately after the rear edge of the first shipment has left the effective range of sensing device $L'1$ and the switching circuits of section I have been reset, the front edge of the next shipment may enter the range of sensing device $L'1$. When this occurs, the selected switching circuits of register section I, for example, the circuit elements SF12 and SF13, register the selected command signal due to the simultaneous excitation of their inputs $a$ and $b'$.

The spacing between two shipments need only be large enough to momentarily deactuate sensing devices L or $L'$, respectively. This is sufficient to reset the switching circuits of the associated register section to their rest condition. For this purpose, a few millimeters are sufficient if transistors or tubes are used in the switching circuits, and 1 to 2 centimeters if relays are used.

Figure 3:
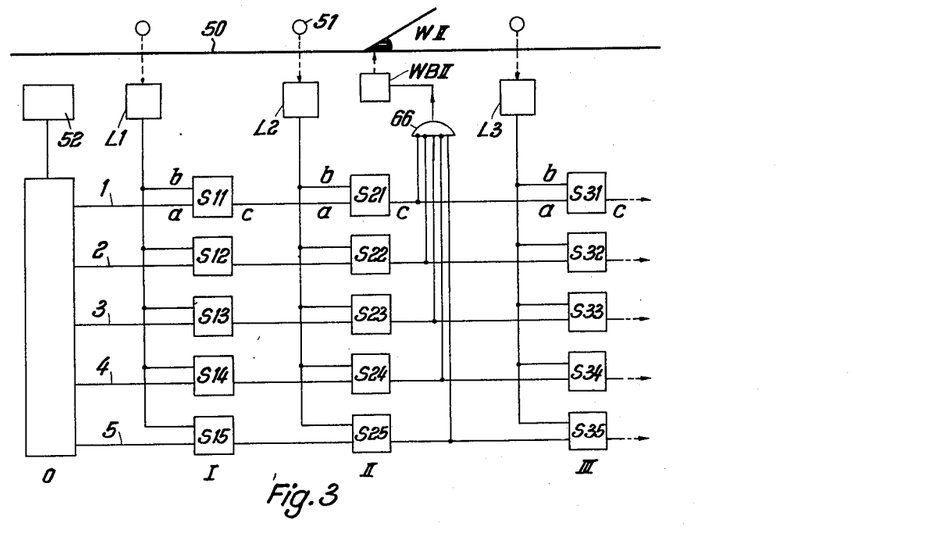
FIGURE 3 is a circuit diagram similar to FIGURE 2, but illustrating another embodiment.

The embodiment of the sorting machine disclosed in FIGURE 3 is similar to that of FIGURE 2 regarding the basic form of the control register. In this embodiment also the individual register sections I, II, III etc., each comprises five circuits S11–S15, S21–S25, S31–S35, etc., whose electrical states are transferred from section to section in stepwise manner and form a combination code causing the switch coordinated with this code to respond at the correct moment. The control register illustrated in FIGURE 3 differs from the one previously described by being constructed of circuits S having especially advantageous characteristics and by the somewhat different nature of the stepwise registering operation to which these circuits S are subjected by the signals of the article sensing devices L.

Figure 5:
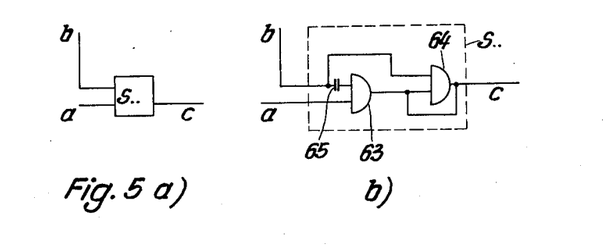
FIGURES 5a and 5b are diagrammatic views which illustrate the construction of the circuits shown in the block diagrams of FIGURES 3 and 4.

Each circuit S has two inputs $a$, $b$ and is designed so that its output $c$ assumes the electrical state corresponding to a command signal only when a signal appears at its second input $b$ while a signal already appears at its first input $a$. Once the circuits S have attained this electrical state they maintain it, independent of the continued presence or absence of a signal at the input $a$, as long as the signal at the input $b$ remains. It may be assumed, for example, that a logic circuit or a sequence circuit corresponds to each of the blocks S shown in FIGURE 3 (FIGURE 5a). The circuit in FIGURE 5b is symbolically represented by two appropriately connected AND-gates 63 and 64 and a capacitor 65.

Each sensing device L1, L2, etc., in FIGURE 3 is connected with the second inputs $b$ of the circuits S of the register sections I, II, etc., and is designed to feed a signal to these inputs. This signal is maintained from the time a shipment enters the effective range of the sensing device until its egress from the effective range. If this signal is absent, the circuits involved are forcibly returned to their rest condition. The first inputs $a$ of the circuits of the first register section I are, in each case, connected with the corresponding output line 1–5 of the command unit 0, while the inputs $a$ of the circuits of the following register sections II, III, etc. are connected with the output $c$ of the corresponding circuit of the preceding register section I, II, etc.

Since the circuits S are shown with only one output $c$, and thus without complementary outputs $\bar{c}$, the switch actuating member WBII is connected with the outputs $c$ of the circuits S21–S25 of the register section II by means of a logic circuit 66. This logic circuit 66 responds when a signal appears at the outputs of the circuits S23 and S25 and simultaneously, a signal is absent from the outputs of the remaining circuits of this register section. It is possible to provide circuits S with the above-mentioned properties which also possess a complementary output $\bar{c}$, in which case an AND-circuit 58, connected as in FIGURE 2, may be used as the decoding stage.

The mode of operation of this embodiment is very similar to that of the sorting machine of FIGURE 2, and therefore a detailed description of the circuit operation accompanying a shipment will be omitted. However, there are the following differences. In the operation of a circuit device containing flip-flop circuits, as do those of FIGURE 2, the condition assumed by these flip-flop circuits depends upon accidental conditions. Therefore, special precautions must be taken to bring all flip-flop circuits into a definite starting or rest condition. Flip-flop circuits, for example, those using transistors or tubes, are sensitive to disturbing pulses which may be caused by switching power apparatus connected with the sorting machine on or off, or which may be present in the vicinity and reach the circuit via supply lines, for instance. In this manner, unintentional registering operations might be caused in the device according to FIGURE 2. Such registering operations are cancelled only when the sensing device L' of the register section involved is released by the egress of a shipment, which transmits the reset pulse via the line leading to the inputs $b''$. However, at this moment, the signal corresponding to the electrical state of this register section has already been received by the next section.

In contrast to this, the circuits S (FIGURES 3, 4, 5) after switching on are in their definite rest condition in which their outputs $c$ do not transmit any signal, since their inputs $b$ are constantly under the effect of the output of the sensing device and in the absence of a signal at these inputs, only the stated condition can be maintained. Therefore, if a disturbing pulse acts on a register section previously in rest condition, a change of the electrical state of the circuits involved which may possibly be thereby effected, is cancelled by the resetting influence due to the lack of a signal from the sensing device immediately after the cessation of the disturbing pulse. The sensing device output can assume two voltage states, of which one, when a signal is present at the input $a$, causes the circuits to change their electrical state, while the other has a mandatory resetting effect. An example of such a circuit will be further disclosed below.

Figure 4:
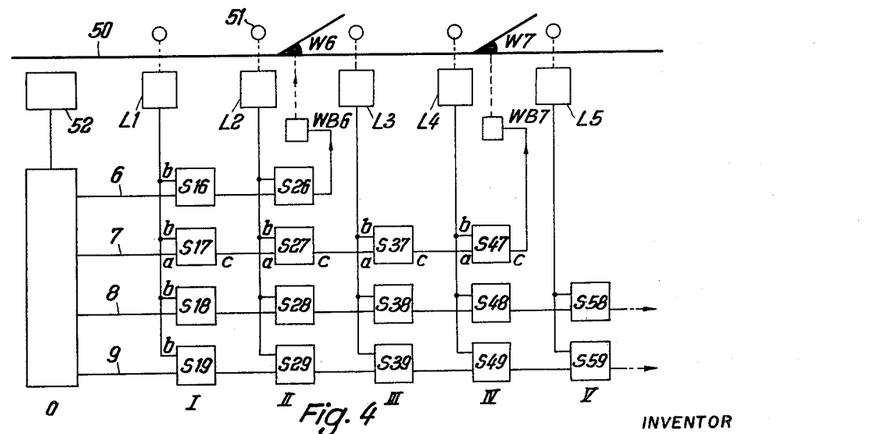
FIGURE 4 is a circuit diagram of a sorting machine having a control register which includes a plurality of register chains, the number of which corresponds to the number of switches.

The embodiment shown in FIGURE 4 is another basic form of the control register also known per se, wherein circuits S are provided and are of the same type used in FIGURE 3. These circuits form correlated chains S16–S26, S17–S27–S37–S47, etc., each of which is coordinated with a particular switch W6, W7, etc. The output of the last circuit element S26, S47, etc. of each chain acts upon the switch actuating member WB6, WB7, etc. of the corresponding switch W6 or W7, etc. The inputs $b$ of the circuits are connected with the output of the sensing device L1–L5 associated with the respective register sections. The inputs $a$ of the circuits of the first register section I are connected with the corresponding control line 6–9 of the command unit 0, and the inputs $a$ of the circuits of the following register sections II–V, etc. are connected with the outputs $c$ of the circuits belonging to the corresponding chain of the preceding register section I–IV, etc.

If a shipment entering the sorting machine of FIGURE 4 is to be diverted by the switch W7, the command signal transmitted by command unit 0 comprises a signal on the line 7 and thus at the input $a$ of the circuit S17. When the shipment enters the range of the sensing device L1, the latter transmits a continuous signal to all inputs $b$ of the register section I. Thus, the condition for circuit S17 to register the signal applied thereto is met, and the command signal is registered. The circuit S17 thereupon feeds a signal to the input $a$ of the next circuit S27 of the chain. Immediately after the shipment enters the range of the sensing device L1, the command signal for a further shipment may be fed to each of the inputs $a$ of the first register section without having a disturbing effect.

Since, when this further command signal arrives, there is already a signal at all inputs $b$ of the section I, none of the circuits S16–S19 will register this further signal. Registering of this signal is possible only after the egress of the first-mentioned shipment from the range of the sensing device L1. Its signal momentarily disappears at the inputs $b$ and reappears anew with the entry of the next shipment into this control section of the conveying path. As for spacing required between consecutive shipments, the same spacing may be used as was mentioned in connection with the embodiment of FIGURE 2. The command signal for the first-mentioned shipment is successively registered by the circuit elements S27, S37 and S47 in synchronism with the movement of this shipment along conveying path 50. In each case, this command signal is automatically cancelled in the preceding circuits as soon as the shipment leaves the range of the associated sensing device. When the command signal registers in circuit S47, the switch actuating member WB7 is immediately excited by the output signal of circuit S47, and the switch W7 is diverted. It is reset as soon as the rear edge of the shipment leaves the sensing device L4, thereby causing the signal in S47 to disappear. The chains S18–S58, etc., and S19–S59, etc., lead to further switches not shown in the drawing.

Although, in general, the use of circuits S with the above illustrated characteristics is more favorable than the use of circuits SF of FIGURE 2, it is also possible, within the scope of the invention to construct a control register of the basic form shown in FIGURE 4 with circuits SF.

Figure 6:
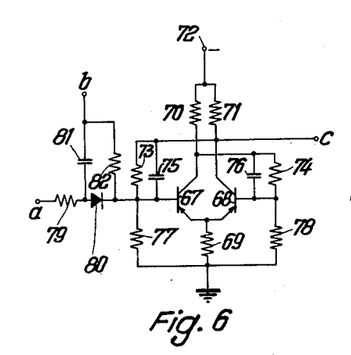
FIGURE 6 is a circuit diagram illustrating the design of such circuits as transistor flip-flop circuits.
Figure 7:
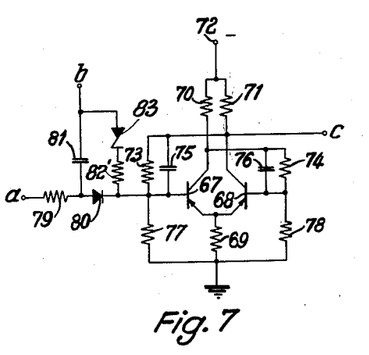
FIGURE 7 is a circuit diagram similar to FIGURE 6 but showing another flip-flop circuit.

FIGURES 6 and 7 illustrate specific detailed embodiments for the circuits S diagrammatically shown in FIGURES 3, 4 and 5a which include two transistor flip-flop circuits having the above-described characteristics. The emitter electrodes of the two transistors 67 and 68 are connected with a reference potential such as ground via a resistance 69. The collector electrodes are connected with the negative terminal 72 of a source of supply voltage via resistances 70 and 71, respectively. Furthermore, each collector is connected with the base of the other transistor via a voltage divider which passes direct current and comprising a resistance 73 or 74 with a capacitor 75 or 76 connected in parallel, and a resistance 77 or 78. An input terminal $a$ is connected with the base of the transistor 67 via resistance 79 and diode 80. A further input terminal $b$ is connected with the connecting point between resistance 79 and diode 80 via a capacitor 81, and is also connected with the base electrode of the transistor 67 via a circuit component which passes direct current. In FIGURE 6 this circuit component is a resistance 82. An output terminal $c$ is connected with the collector electrode of the transistor 68. With an operating voltage of 12 v., depending upon the conductivity state of the transistor 68, a voltage of about −10.5 v. or of −1.5 v. appears at terminal $c$, the latter voltage corresponding to a signal.

Assume that with an operating voltage of 12 v. in the rest condition, a voltage of −10.5 v. appears at the inputs $a$ and $b$ of the circuit of FIGURE 6 and that a voltage of −10.5 v. also appears at the output terminal $c$, with transistor 67 conducting and transistor 68 being blocked. The resistance 82 is now selected to be of such value that:

(a) No change of the rest condition occurs when a signal, that is, a voltage of −1.5 v., appears only at the input $a$ or only at the input $b$;

(b) No change of the rest condition occurs when a signal appears first at the input $b$ and subsequently at the input $a$;

(c) Transistor 67 is blocked and transistor 68 conducts when a signal appears first at the input $a$ and then at the input $b$;

(d) This new electrical state is maintained, independent of the voltage at the input $a$, as long as the signal remains at the input $b$; and (e) The circuit is brought back into the rest condition, independent of the voltage at the input $a$, as soon as the signal disappears at the input $b$, that is, when the voltage $-10.5$ v. again appears at this input.

Such a design may be provided without difficulty and may be ascertained empirically the following being an example of a suitable circuit:

Transistors 67 and 68=Type OC 604gn (Telefunken), resistance 69=160 ohms, resistance 70 and 71=1.6K ohms, resistance 73 or 74=7.5K ohms, capacitor 75 and 76=2000 pf., resistance 77 and 78=2.7K ohms, resistance 79=10K ohms, diode 80=Type OA 159 (Telefunken), capacitor 81=2000 pf., resistance 82=15K ohms.

The circuit according to FIGURE 7 has some components corresponding to those in the circuit of FIGURE 6 and these are provided with the same reference characters. This circuit is substantially less sensitive to fluctuations of the operating voltage and of the other operating conditions than the one previously described. It differs from the previously described circuit in that, in addition to a resistance 82', an avalanche or Zener diode 83 is provided in the circuit branch between the input $b$ and the base electrode of the transistor 67. Resistance 82' may f.i. be of 5.6K ohms, Zener diode 83 of Type OA 126/6 (Telefunken).

Figure 8:
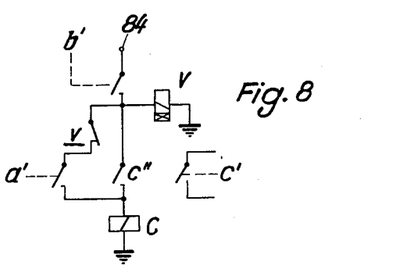
FIGURE 8 is a circuit diagram of such circuits constructed with relays.

A circuit S (FIGURES 3, 4, 5a) with the characteristics set forth above also may be designed as a relay circuit. FIGURE 8 shows an embodiment of such a circuit in rest condition or position. It comprises two relays C and V, with the latter having delayed actuation, and contains two input contacts $a'$ and $b'$ which may be externally actuated, as well as an output contact $c'$ for relay C. These relays are connected on one side with one terminal of a current source (reference potential) whose other terminal is connected to the terminal 84. A rest contact $v$ of delay relay V is in series with the input contact $a'$, and an operating contact $c''$ of relay C is in series with the input contact $b'$ and parallel to contacts $a'$ and $v$.

If the input contact $a'$ is first actuated and then the input contact $b'$ is actuated, relay C is energized via 84, $b'$, $v$ and $a'$ and connects itself with contact $b'$ by means of its self-holding contact $c''$ and thereby also closes the output contact $c'$. When this occurs the relay V is actuated after a delay and opens its contacts $v$. However, contact $v$ no longer has any influence on the excitation of relay C just as a subsequent opening of $a'$ would have no influence. As soon as $b'$ is opened both relays are released and $c'$ is also opened. However, when in the rest condition if $b'$ is first closed, only relay V can be actuated, opening $v$. If $a'$ is now closed, the relay C cannot be excited because of the open contact $v$. In this event $c'$ remains open. It may be seen that such a circuit also has the characteristics necessary for the mode of operation of a circuit S according to the invention. In arranging circuits of this type in tandem, the input contact $a'$ of a circuit would be the output contact $c'$ of the preceding circuit, that is, it would be identical with the latter.

Figure 9:
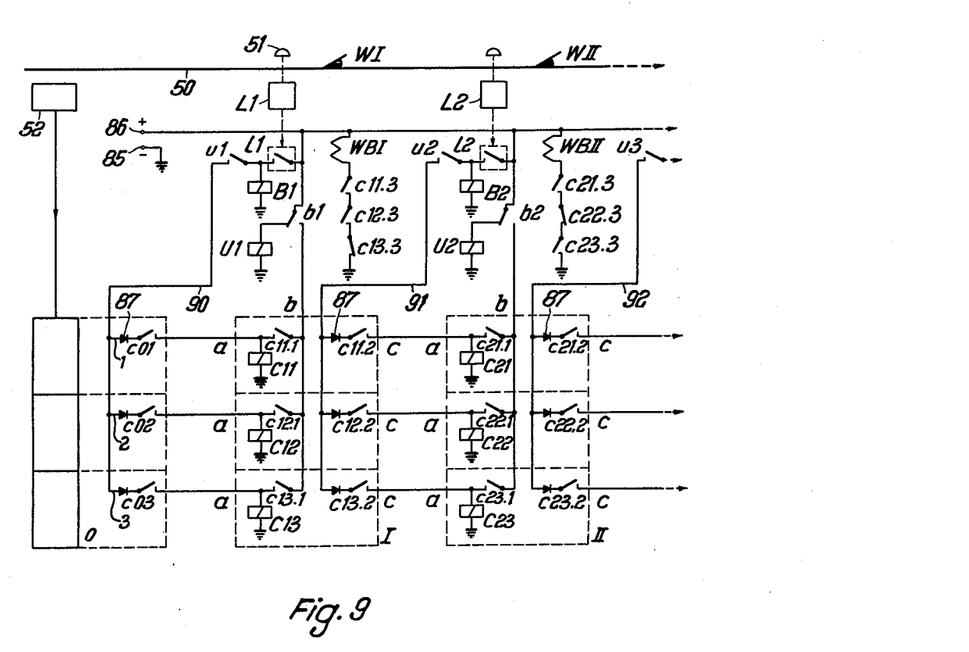
FIGURE 9 is a circuit diagram of a sorting machine similar to FIGURE 3 having its control register comprised of relay circuits.

FIGURE 9 illustrates an embodiment of a sorting machine wherein the control register has the same basic design as in FIGURE 3 and wherein the register sections I, II, etc. are constructed of relay circuits having a similar mode of operation as the circuit according to FIGURE 8.

Each of the register sections I, II, etc. contains three relays C11, C12, C13; C21, C22, C23; etc., corresponding to the number of the output lines 1, 2, and 3 of the command unit 0. These relays each actuate one self-holding contact $c11.1$, $c12.1$, etc. and one output contact $c11.2$, $c12.2$, etc. The lines carrying the exciting signal for these relays are connected to correspond to the inputs $a$ of FIGURES 3 to 5, and are connected with the corresponding output contacts of the preceding register sections. In those sections with which switches are coordinated, such as, for example, WI and WII, relays C11, C12, etc. have additionally associated therewith decoding contacts $c11.3$, $c12.3$, etc. which, corresponding to the code coordinated with the switch, are designed as operating contacts or as rest contacts. Each of the register sections I, II, etc. is further coordinated with one relay B1, B2, etc., and one relay U1, U2, etc., having a delayed release. The current source for the relays is connected with the terminals 85 and 86. The output contacts $c11.2$, $c12.2$, etc. of each register section are connected with the operating contact $u2$, $u3$, etc. of the relay U2, U3, etc. of the following register section via decoupling diodes 87 and one common supply line 91, 92, etc., for each.

Also, the output lines 1, 2 and 3 are connected to output contacts $c01$, $c02$ and $c03$ of the command unit 0, the supply line 90 of which is connected with the operating contact $u1$ of section I. The circuit of the sensing device L1, L2, etc. acts on a contact $l1$, $l2$, etc., in the associated register section I, II, etc., in such a manner that this contact is closed as long as a shipment is present in the effective range of the associated sensing device. The circuit according to FIGURE 9 operates as follows:

In the rest position of the circuit, all relays U1, U2, etc. are energized via the contacts $b1$, $b2$, etc. of the deenergized relays B1, B2, etc. The operating contact $u1$, $u2$, etc. is, therefore, closed. Assume that a shipment enters the conveying path 50 and is to be diverted by the switch WII coordinated with a code 1–3. Accordingly, the contacts $c01$ and $c03$ are closed at the command unit 0. As soon as the shipment enters the range of the sensing device L1, the contact $l1$ is closed so that the relays B1, C11, and C13 are energized, the latter relays C11 and C13 being energized via $u1$, 90 and $c01$ or $c03$, respectively. The contact $b1$ is opened and after a time delay of about 10 milliseconds, the relay U1 is released due to the opening of its contact $u1$, and the lines 1 and 3 no longer are connected with the voltage source. However, in the meantime, a voltage has been applied to the relays C11 and C13 via $b1$, corresponding to input $b$ in the FIGURES 3 to 5, and its self-holding contacts $c11.1$ and $c13.1$ receive current, and the relays remain energized. In this relay circuit, too, the command signal of the next shipment may be initiated as early as this moment, for example, by the closing of the contacts $c01$, $c02$ and $c03$. Since the contact $u1$ is open, this at first has no effect.

If the shipment enters the range of the sensing device L2, the contact $l2$ is closed. The relays C21 and C23 are energized via $u2$, the line 91, and the closed output contacts $c11.2$ and $c13.2$ of section I, corresponding to the outputs $c$ of FIGURES 3 to 5. They assume a holding position through their contacts $c21.1$ and $c23.1$, and the contact $b2$ which is thrown over by relay B2. The decoding contacts $c21.3$ and $c23.3$ are also thereby closed and, via these contacts and the rest contact $c2.23$ of the relay C22 which is not moved, the circuit of a switch actuating magnet WBII is closed and the switch WII is diverted.

As soon as the first-mentioned shipment leaves the range of the sensing device L1, the contact $l1$ is opened whereby the relay B1 is released. This causes the holding circuit of the relays C11 and C13 to be interrupted by the throwing over of $b1$ (into the position shown in the drawings) so that these relays C11 and C13 are also released.

U1 is again actuated, closing $u1$, so that the relays C11, C12 and C13 are connected to the contact $l1$ via the contacts $c01$, $c02$ and $c03$, already closed according to the command signal for the next shipment. With the entry of the next shipment into the range of the sensing device L1, the contact $l1$ is closed anew, and the relays mentioned receive the new command signal in the manner already described. As soon as the first-mentioned shipment leaves L2, $l2$ opens, releasing the relays C21 and C23, and $b2$ is thrown over, and the circuit of the switch actuating magnet WBII is interrupted by the opening of $c21.3$ and $c23.3$. At this time the switch WII goes back into its position of rest.

Clearly, the sorting machine according to FIGURE 9, designed with relay circuits, exhibits the same advantageous behavior as the circuit according to FIGURE 3 or the circuits of the other examples previously described, even when a shipment is lost or runs up onto the preceding shipment.

In a similar manner, a control register having the basic form shown in FIGURE 4 could also be constructed with relay circuits.

It will be understood that the above description of the present invention is susceptible to various modifications, changes and adaptations, and the same are intended to be comprehended within the meaning and range of equivalents of the appended claims.

What is claimed is:

1. In a sorting machine comprising: a plurality of diverting switches arranged along a conveying path; a control register subdivided into a plurality of sections and subject to a stepwise sequential switching operation proceeding from section to section, which control register controls the actuation of said switches and into whose first section a command signal is fed when an article enters the conveying path, which command signal designates the switch at which such article is to be diverted; and a plurality of sensing means arranged along said path and responsive to the passage of the articles, said sensing means being connected, respectively, with said sections for effecting, in synchronism with the movement of the individual articles, the stepwise switching of the particular command signal pertaining to each respective article up to the control section associated with the switch located at the point along said path where such article is to be diverted, the improvement that the distance between consecutive sensing means is less than the length of the shortest article to be handled by the sorting machine.

2. In a sorting machine, the combination which comprises: means forming a conveying path; a plurality of diverting switches arranged along said path; a control register having a number of sequentially connected sections which include a plurality of sections that are connected to said plurality of diverting switches, respectively, through all which sections a command signal applied to the register may progress sequentially from section to section; means for applying to said register, when a given article enters said path, a command signal which designates the switch at which such article is to be diverted; and a number of sensing means arranged along said path and responsive to the passage of the articles, said sensing means being connected, resepectively, with said sections for effecting, in synchronism with the movement of the individual articles, the stepwise progression of the particular command signal pertaining to any one article up to the particular control section associated with the switch located at the point along said path where such article is to be diverted, the distance between consecutive sensing means being less than the length of the shortest article to be handled by the sorting machine.

3. A sorting machine as defined in claim 2, wherein each register section is fed the command signal from a preceding register section when the sensing means associated with such register section senses an article, each register section retaining a command signal therein for at most as long as the sensing means associated with such register senses an article.

4. A sorting machine as defined in claim 3, wherein each control register section comprises: a similar number of switching circuits, each having at least two inputs and an output which may assume one of two electrical states, said outputs in combination forming a code in functional dependence upon the signals appearing at the inputs and the sequence of their arrival, the output of each circuit being connected with one input of the corresponding circuit of a subsequent register section, another input of each circuit being connected with the sensing means associated with the register section of which the circuit is a part; an actuating member for each switch; and a plurality of decoding stages one for each switch and each having its output feeding an actuating member, each decoding stage having inputs which are linked with the outputs of the circuits of the associated register section in dependence on the code coordinated with this switch.

5. A sorting machine according to claim 4, wherein each circuit has first, second and third inputs and includes an AND-gate and a flip-flop circuit, said first and second inputs being connected to said AND-gate whose output feeds the input of the flip-flop circuit, said third input being a reset input of said flip-flop circuit, each circuit being connected with the sensing means of the associated register section so that when an article enters the effective range of said sensing means, a short duration signal arrives at said second input and when the article leaves the effective range, a reset signal arrives at the third input of the circuit; the first inputs of the circuits of the first register section being connected with the output lines of a sensing means and the first inputs of the circuits of the following register sections being connected in each case with the output of the flip-flop circuit of the preceding register section.

6. A sorting machine as defined in claim 4, wherein said decoding stages are AND-gates.

7. A sorting machine according to claim 6, wherein those circuits of the register sections which do not correspond to the selected code have a second output, the input side of said AND-gates being connected in each case with the outputs of those circuits corresponding to the code and also with said second outputs.

8. A sorting machine according to claim 3, wherein said control register includes: an actuating member for each switch; and a plurality of register chains the number of which corresponds to the number of switches to be controlled, said register chains each including individual circuits coordinated in sequence with the register sections and provided with at least two inputs and one output which assumes one of two states, in functional dependence upon the signals appearing at the inputs of the associated circuits and upon the sequence of their arrival, said outputs being connected with one input of a following circuit, at least one other input of each circuit being connected with the associated sensing means, and the output of the last circuit of each register chain being connected with the actuating member of the associated switch.

9. A sorting machine according to claim 8, wherein said switch actuating members actuate their associated switches and maintain them diverted as long as the command signal effecting this actuation is present in the associated register section.

10. A sorting machine according to claim 3, each control register section comprising: a similar number of switching circuits, each having two input means and an output means which may assume one of two electrical states, said output means in combination forming a code in functional dependence upon the signals appearing at the input means and the sequence of their arrival, the output means of each circuit being connected with one input means of the corresponding circuit of a subsequent register section, another input means of each circuit being connected with the article sensing means associated with the register section of which the circuit is a part; an actuating member for each switch; and a plurality of decoding stages one for each switch and having its output means feeding an actuating member, each decoding stage having inputs which are linked with the output means of the circuits of the associated register section in dependence on the code coordinated with this switch.

11. A sorting machine as defined in claim 10, comprising: a source of current, each circuit including a flip-flop circuit having a network which passes direct current, said flip-flop circuit including two transistors having their collectors connected with said current source via a resistance for each, and connected with the base of the other transistor via said network, said first input means being connected with the base of one transistor via a resistance and a diode, the second input means being connected between said resistance and said diode via a capacitor and also connected to said base via a circuit component which passes direct current.

12. A sorting machine according to claim 11, wherein said circuit component which passes direct current is a resistance.

13. A sorting machine according to claim 11, further comprising an avalanche diode arranged in the portion of the circuit between said second input means and the base of the transistor.

14. A sorting machine according to claim 10, wherein said circuits are relay circuits.

15. A sorting machine, comprising, in combination: an article conveyor having a conveying path; a plurality of diverting switches disposed along said conveyor for diverting articles out of said conveying path when actuated; and a control register for controlling the actuation of said switches, said register including a command unit fed with switching information to provide, when an article enters the conveying path, a command signal designating the switch at which such article is to be diverted, and a plurality of register sections sequentially connected with each other and with said command unit, at least some of said register sections including switch actuating means, said sections being arranged to transmit the command signal from one to the other in a progressive manner up to the section including the actuating means of the designated switch, each of said sections including article sensing means disposed along the conveying path and controlling the progressive transmission of command signals in synchronism with article movement, the distance between sensing means in the conveying direction being less than the length of the shortest article to be handled.

16. A sorting machine, comprising, in combination: an article conveyor having a conveying path; a plurality of switches disposed along said path for diverting articles away from said path when actuated; a control register including a plurality of successively connected sections and controlling actuation of said switches, said register including a command unit for feeding a command signal upon being fed with switching information when an article enters the conveying path, which signal designates the switch at which an article is to be diverted, said register being arranged to feed the signal progressively from one section of the register to the next; and a plurality of article sensing means, each connected with one section of the register and arranged along the conveying path for controlling the progression of command signals in synchronism with article movement, the distance between sensing means in the conveying direction being less than the length of the shortest article to be handled.

17. A sorting machine according to claim 8, each control register section comprising: a similar number of switching circuits, each having two input means and an output means which may assume one of two electrical states, said output means in combination forming a code in functional dependence upon the signals appearing at the input means and the sequence of their arrival, the output means of each circuit being connected with one input means of the corresponding circuit of a subsequent register section, another input means of each circuit being connected with the article sensing means associated with the register section of which the circuit is a part; an actuating member for each switch; and a plurality of decoding stages one for each switch and having its output means feeding an actuating member, each decoding stage having inputs which are linked with the output means of the circuits of the associated register section in dependence on the code coordinated with this switch.

18. A sorting machine as defined in claim 17, comprising: a source of current, each circuit including a flip-flop circuit having a network which passes direct current, said flip-flop circuit including two transistors having their collectors connected with said current source via a resistance for each, and connected with the base of the other transistor via said network, said first input means being connected with the base of one transistor via a resistance and a diode, the second input means being connected between said resistance and said diode via a capacitor and also connected to said base via a circuit component which passes direct current.

19. A sorting machine according to claim 18, wherein said circuit component which passes direct current is a resistance.

20. A sorting machine according to claim 18, further comprising an avalanche diode arranged in the portion of the circuit between said second input means and the base of the transistor.

21. A sorting machine according to claim 17, wherein said circuits are relay circuits.

References Cited in the file of this patent

UNITED STATES PATENTS

| | | |
|---|---|---|
| 2,993,596 | Steinbuch | July 25, 1961 |
| 3,000,519 | Purnell | Sept. 19, 1961 |

FOREIGN PATENTS

| | | |
|---|---|---|
| 682,303 | Great Britain | Nov. 5, 1952 |